United States Patent
Kawamura

Patent Number: 5,515,823
Date of Patent: May 14, 1996

[54] ENGINE WITH PRECOMBUSTION CHAMBERS

[75] Inventor: Hideo Kawamura, Kanagawa, Japan

[73] Assignee: Isuzu Ceramics Research Institute Co., Ltd., Kanagawa, Japan

[21] Appl. No.: 340,868

[22] Filed: Nov. 15, 1994

[30] Foreign Application Priority Data

Dec. 6, 1993 [JP] Japan ................................. 5-339201
Dec. 6, 1993 [JP] Japan ................................. 5-339202

[51] Int. Cl.⁶ .......................... F02B 19/08; F02B 19/18
[52] U.S. Cl. ................................ 123/262; 123/276
[58] Field of Search .............................. 123/262, 263, 123/276, 279, 292, 254

[56] References Cited

U.S. PATENT DOCUMENTS

| | | | |
|---|---|---|---|
| 1,633,541 | 6/1927 | Braren | 123/276 |
| 1,708,056 | 4/1929 | French | 123/276 |
| 2,151,218 | 3/1939 | Lutz | 123/276 |
| 2,505,999 | 5/1950 | Smith | 123/262 |
| 2,831,468 | 4/1958 | Witzky | 123/276 X |
| 3,132,633 | 5/1964 | Zimmerman | 123/276 X |
| 3,424,137 | 1/1969 | Guertler | |

FOREIGN PATENT DOCUMENTS

| | | |
|---|---|---|
| 0598605 | 5/1994 | European Pat. Off. . |
| 2562163 | 10/1985 | France . |
| 62-93141 | 6/1987 | Japan . |
| 2-112613 | 4/1990 | Japan . |
| 5-26111 | 2/1993 | Japan . |

Primary Examiner—Tony M. Argenbright
Attorney, Agent, or Firm—Browdy & Neimark

[57] ABSTRACT

In this engine with precombustion chambers, precombustion chambers are formed in pistons, and an air utilization rate in main combustion chambers formed in cylinders is improved, whereby the mixing of air with flames is promoted with a combustion period reduced. In this engine, main communication ports communicating the main combustion chambers and precombustion chambers with each other are formed in the substantially central portions of piston heads, while auxiliary communication ports are formed around the main communication ports so as to extend incliningly toward the circumferences of the cylinders. The fuel injection nozzles provided in a cylinder head are projected into the main communication ports in positions in the vicinity of the top dead centers of the pistons to close the same, and fuel is injected from multi-bored injection ports of the fuel injection nozzles into the precombustion chambers. The flames ejected from the precombustion chambers into the main combustion chambers are guided by the auxiliary communication ports and cavities and turned into turning flows of flame jets, which are mixed with suction swirls to promote the combustion of gases in the main combustion chambers.

13 Claims, 2 Drawing Sheets

ENGINE WITH PRECOMBUSTION CHAMBERS

BACKGROUND OF THE INVENTION

1. Field of the Invention

This invention relates to an engine provided with precombustion chambers on the side of pistons.

2. Description of the Prior Art

A swirl chamber type engine provided with swirl chambers for the purpose of improving the combustion efficiency of the engine has been developed. The swirl chamber type engine has swirl chambers formed in a cylinder head or piston heads, communication ports via which the swirl chambers and main combustion chambers formed in cylinders communicate with each other, and fuel injection nozzles for injecting a fuel into the swirl chambers. In this engine, a gaseous mixture of an eddy current and a fuel flowing into the swirl chambers via the communication ports is formed and subjected to primary combustion, and gases, such as flames and an unburnt gaseous mixture are then ejected from the swirl chambers into main combustion chambers via the communication ports and subjected to secondary combustion. There is a combustion chamber structure disclosed in Japanese Patent Laid-Open No. 112613/1990 which constitutes an example of such a swirl chamber type engine.

Japanese Utility Model Laid-Open No. 93141/1987 discloses a piston consisting of a ceramic crown and an aluminum skirt. In this piston, a head portion of a cylindrical aluminum skirt is fitted around the outer circumferential surface of the ceramic crown in which a cavity is formed, and the outer circumferential surface of a combustion chamber and the head portion of the skirt are fixed by a cast iron ring.

Japanese Patent Laid-Open No. 26111/1993 discloses a heat insulating piston. In this heat insulating piston, the heat insulation between a piston head and a piston skirt is secured, and the cracking and scattering of a heat insulating member provided between joint portions of the two parts are prevented.

In general, the combustion temperature in a precombustion chamber is high, and, therefore, carrying out the combustion of a gaseous mixture at a high fuel-air ratio is effective as measures for reducing the production of NOx. In order to burn a gaseous mixture at a high fuel-air ratio in an advantageously constructed engine therefor when a combustion temperature is high, using a precombustion chamber type engine is effective. In order to increase a combustion speed in a precombustion chamber type engine formed by providing a precombustion chamber in a conventional engine, it is necessary that a cross-sectional area of a communication port via which the precombustion chamber and a main combustion chamber communicate with each other be reduced so as to increase the velocity of flow of an eddy current and that of a jet current entering the main combustion chamber. However, when the cross-sectional area of the communication port is reduced, the flow rate of a gaseous mixture ejected from the precombustion chamber into the main combustion chamber increases but a throttle loss becomes large. Moreover, the combustion of a gaseous mixture in the primary combustion chamber is not sufficiently carried out.

When the cross-sectional area of a communication port in an engine, which is provided at a circumferential portion of each cylinder therein with a communication port which communicates a main combustion chamber and a precombustion chamber with each other, is increased so as to reduce a throttle loss, the penetration of injection of gases, such as flames and an unburnt gaseous mixture ejected from the precombustion chamber into the main combustion chamber becomes small, so that the gases do not reach the central portion of the cylinder. In order to improve the thermal efficiency of the engine, it is important to complete the combustion of a gaseous mixture in a short period of time by improving the air utilization rate in the main combustion chamber, and prevent the occurrence of white smoke.

In a swirl chamber type engine, the cross-sectional area of a communication port communicating a precombustion chamber and a main combustion chamber with each other is set small so as to solve these inconveniences. This causes a throttle loss due to the communication port to occur, and an engine output to decrease. In general, a communication port communicating a main combustion chamber and a precombustion chamber with each other is called a reentrant type communication port and provided solely in the central portion of a cylinder in a direct injection type engine, and solely in an outer circumferential portion of a cylinder in a precombustion chamber type engine. Accordingly, a distance over which an injection current has to run becomes long, and the mixing of a fuel with air in a main combustion chamber is not carried out sufficiently to cause HC and smoke to occur.

SUMMARY OF THE INVENTION

A primary object of the present invention is to solve these problems, and provide an engine with precombustion chambers which comprises of main combustion chambers formed in cylinders, and precombustion chambers formed in piston heads, and which is characterized in that the shape of the main combustion chambers and the construction of communication ports communicating the main combustion chambers and precombustion chambers with each other are determined optimumly so as to enable the penetration of injection of gases, such as flames and an unburnt gaseous mixture from the precombustion chambers into the main combustion chambers to be improved, the travel distance of these gases from the precombustion chambers to the main combustion chambers to be reduced, the air utilization rate in the main combustion chambers to be improved, the mixing of the gaseous mixture with the fresh air existing in the main combustion chambers to be promoted, the combustion of the gaseous mixture to be completed in a short period of time, the thermal efficiency of the engine to be improved, and the generation of NOx, carbon and smoke to be reduced.

Another object of the present invention is to provide a diesel engine with precombustion chambers, having a cylinder head fixed to a cylinder block provided with cylinders therein, communication ports communicating main combustion chambers formed in cylinders and precombustion chambers formed in piston heads with each other, and fuel injection nozzles capable of spraying a fuel into the precombustion chambers and fixed to the cylinder head, wherein the precombustion chambers are formed in the substantially central portions of the piston heads, the communication ports being formed in the substantially central portions of the piston heads, each of the main combustion chambers and each of the precombustion chambers communicating with each other via a main communication port and a plurality of auxiliary communication ports, the auxiliary communication ports being formed on the outer side of the main communication port so as to extend incliningly toward an upper circumferential portion of a relative cylinder, each of the fuel injection nozzles being adapted to be projected into the main communication port in a position in the vicinity of a top dead center of a piston, and close the main communication port and inject a fuel from a multi-bored injection port formed in the fuel injection nozzle into the precombustion chamber.

In this engine provided with precombustion chambers, the main combustion chambers are formed by cavities provided in a lower surface of the cylinder head, and an air utilization rate in the main combustion chambers of gases, such as flames and unburnt gaseous mixture introduced from the precombustion chambers into the main combustion chambers is improved by utilizing the swirls of suction air in the main combustion chambers. The mixing of the gases with the fresh air existing in the main combustion chambers is thereby promoted, and a combustion speed increases. The auxiliary communication ports extend incliningly with respect to the cylinder head and are opened in conical surfaces of the piston heads. Accordingly, the gases, such as flames and unburnt gaseous mixture can be elected smoothly from the precombustion chambers toward the circumferential portions of the cylinders through the auxiliary communication ports, so that the penetration of injected gases can be improved.

Each of the main combustion chambers is formed convergently toward the center of a relative piston so that the height of a clearance between the portion of an upper surface of the piston which correspond to the top dead center thereof and a lower surface of the cylinder head becomes as small as possible at a circumferential portion of the piston and gradually larger toward the center thereof, and a plurality of auxiliary communication ports extend in a divergent arrangement toward an upper circumferential portion of the cylinder and are opened so as to face the lower surface of the cylinder head. Therefore, a large amount of air exists in the central portion of the main combustion chamber when the piston is in a compression top dead center, and the gases, such as flames and unburnt gaseous mixture injected from the precombustion chamber into the main combustion chamber through the auxiliary communication parts advances in the shape of an edge of a knife toward the circumferential portion of the cylinder in a position in the vicinity of the top dead center of the piston. The penetration of injected gases from the precombustion chamber into the main combustion chamber converts the gas speed into a pressure as the gases advance, to allow the gases to flow uniformly and reach a circumferential wall surface of the cylinder in a short period of time.

The precombustion chamber is positioned in the central portion of the piston, and the auxiliary communication ports extend toward the circumference of the cylinder. The auxiliary communication ports are formed plurally and radially in a regularly spaced manner around the main communication port, and the gases, such as flames and unburnt gaseous mixture injected from the precombustion chamber into the main combustion chamber are ejected toward the circumference of the cylinder. Moreover, since the auxiliary communication ports are provided around the main communication port, the travel distance of the gases, such as flames and unburnt gaseous mixture injected from the precombustion chamber into the main combustion chamber becomes uniformly short, and the time during which the gases injected from the precombustion chamber into the main combustion chamber reach the circumference of the cylinder decreases. This enables the gases to reach the circumference of the cylinder in a short period of time, the gaseous mixture to be mixed with the fresh air existing in the main combustion chamber, in a short period of time, the air utilization rate in the main combustion chamber to be improved, the mixing of the gaseous mixture with the fresh air to be promoted, the combustion of the gaseous mixture to be promoted and completed in a short period of time, a combustion speed to be increased, a combustion time to be reduced, and the generation of NOx, HC and smoke to be minimized.

The generation of NOx can be minimized by carrying out the combustion in the precombustion chamber at a high fuel-air ratio. Moreover, a total cross-sectional area of the auxiliary communication ports can be set large, and a throttle loss can be reduced.

Since the wall portion of the piston head which defines the precombustion chamber is fitted and fixed in a central mount hole formed in a piston skirt, this wall portion forming the precombustion chamber constitutes a mounting boss. Accordingly, the construction of the engine becomes simple, and the degree of freedom of designing the engine increases.

Since each of the fuel injection nozzles is wrapped at the outer circumferential portion thereof in a heat insulating cover, it is not broken due to thermal stress even when it is inserted into and withdrawn from the main communication port repeatedly, though the part of the engine which is in the vicinity of the main communication port has a high temperature with the fuel injection nozzle exposed to the heat of high temperature. Since the height of a clearance between the portion of the upper surface of the piston which is in the vicinity of the top dead center thereof and the lower surface of the cylinder head is set as small as possible in the portion thereof which is around the piston, and gradually larger toward the center of the piston, a large amount of air exists in the central portion of the piston, and the air can enter the circumferential portion of the cylinder reliably and uniformly by its wedging effect when the piston is in a position in the vicinity of the compression top dead center. This enables the air utilization rate to be improved.

In this engine with precombustion chambers, the main combustion chambers are formed by a plurality of cavities provided in the portions of the lower surface of the cylinder head which are around the fuel injection nozzles, and the auxiliary communication ports in the portions of the piston heads which are around the primary communication ports so as to extend in a convergent arrangement from the outer side of the cylinders toward the inside thereof, i.e., toward the cavities so that the auxiliary communication ports communicate the main combustion chambers and precombustion chambers with each other. The auxiliary communication ports are formed plurally and radially in a regularly spaced manner around the main communication ports so that the gases, such as flames and unburnt gaseous mixture injected from the precombustion chambers into the main combustion chambers, i.e. cavities advance toward the circumference of the cylinders.

Each of the cavities has a flame escape recess formed by enlarging in the circumferential direction of a burning flow of flames ejected from the precombustion chamber into the main combustion chamber through the auxiliary communication ports. The gases, such as flames and unburnt gaseous mixture injected from the precombustion chamber into the main combustion chamber through the auxiliary communication ports are turned into a turning flow of flame jet advancing to the cavity, in which the gases are mixed with a suction swirl existing therein, mixed combustion being thereby promoted. The auxiliary communication ports are formed in an offset manner with respect to the center of the precombustion chamber, and the turning flow of flames ejected from the precombustion chamber into the cavity through the auxiliary communication ports is mixed with the suction swirl existing in the main combustion chamber.

The gases, such as flames and unburnt gaseous mixture are ejected smoothly at a high speed from the precombustion chamber into the main combustion chamber comprising of the cavity via the auxiliary communication ports, and guided by the cavity to form a turning flow of flame jet. This turning flow of flame jet is mixed with the suction swirl remaining in the main combustion chamber, and the mixing of them is promoted to cause a combustion speed to increase and a combustion period to be reduced. This enables the combustion of the gaseous mixture to be completed in a short period of time, the thermal efficiency of the engine to be improved, and the generation of NOx, HC and smoke to be minimized.

DESCRIPTION OF THE PREFERRED EMBODIMENTS

Figure 1:
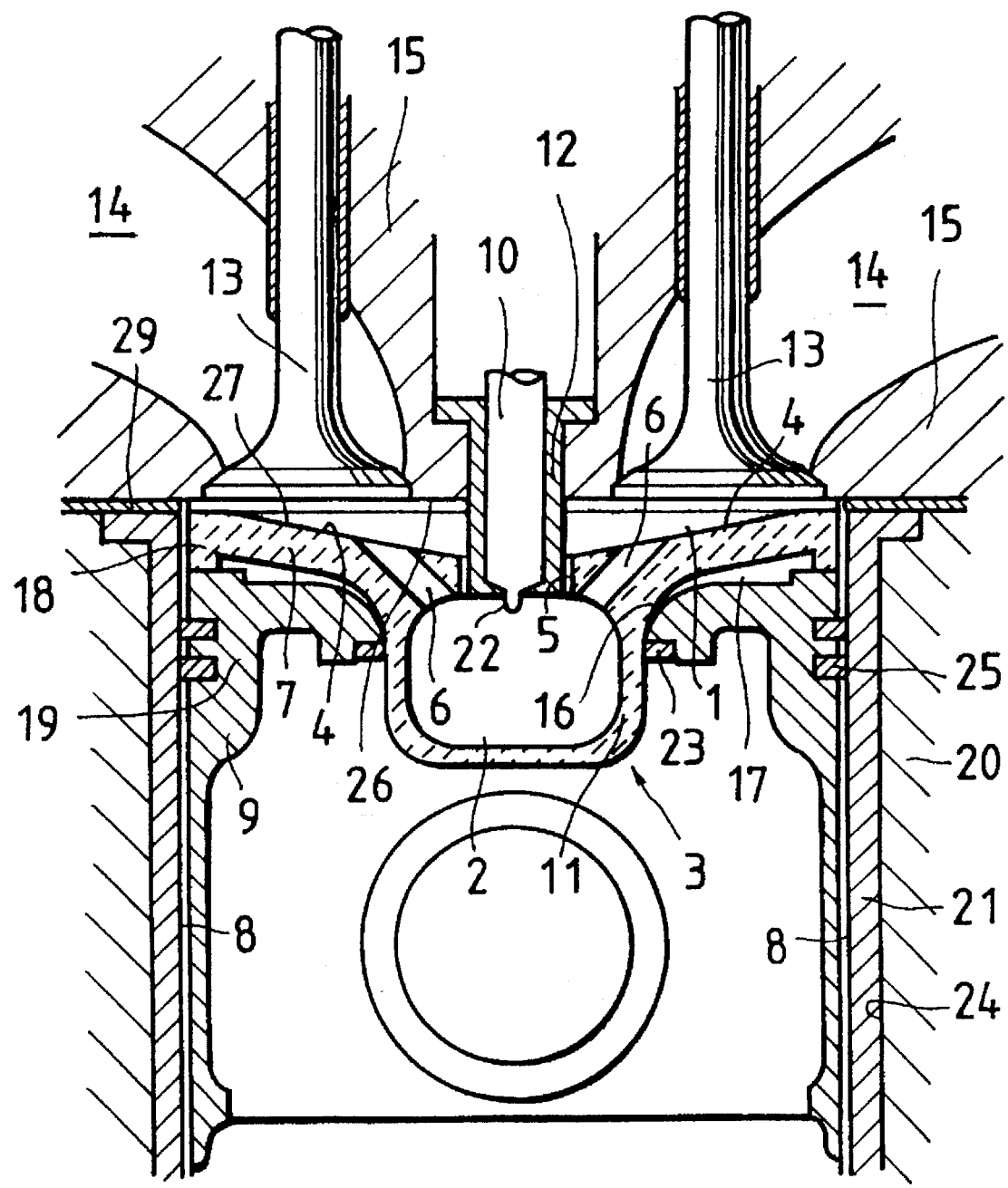
FIG. 1 is a sectional view of an embodiment of the engine with precombustion chambers according to the present invention.

An embodiment of the engine with precombustion chambers according to the present invention will now be described with reference to FIG. 1. This engine with precombustion chambers, consisting of a cylinder block 20 provided with cylinders 8, a cylinder head 15 fixed to the cylinder block 20 via a gasket 29, fuel injection nozzles 10 fixed to the cylinder head 15, and pistons 3 moving reciprocatingly in the cylinders 8 can be applied to a precombustion chamber type diesel engine.

This embodiment is a precombustion chamber type diesel engine in which precombustion chambers 2 are formed in pistons 3. The cylinder block 20 has bores 24 the number of which corresponds to that of cylinders in the engine. Cylinder liners 21 forming cylinders 8 may be fitted in these bores 24, or the bores 24 themselves may constitute the cylinders 8, though they are not illustrated. The cylinder head 15 is provided with suction exhaust ports 14, in which suction exhaust valves 13 are provided. The suction exhaust ports can also be provided in the lower portions of the cylinders when occasion demands.

This engine with precombustion chambers comprises of piston skirts 9 formed out of a metal, such as an aluminum alloy and FC, piston heads 7 fixed to the piston skirts 9 and formed out of a heat resisting material including a ceramic material of a high strength, such as $Si_3N_4$, and precombustion chamber walls 11 formed integrally with the piston heads 7. Each of the piston skirts 9 is provided with a groove in which a piston ring 25 is fitted, and an upper wall portion 19 of the piston skirt 9 is provided with a mount hole 16 in the central part thereof. Each piston head 7 has at its central lower part a precombustion chamber wall portion 11 constituting an annular boss. The piston head 7 has at its circumferential part a downwardly extending cylindrical portion, i.e. an annular portion 18, and at its central part a downwardly extending precombustion chamber wall portion 11 which defines a precombustion chamber 2.

The piston head 7 and piston skirt 9 can be fixed to each other by fitting the precombustion chamber wall portion 11 of the piston head 7 in the mount hole 16 in the piston skirt 9, and burying a fixing metal ring 23 in the form of a metal flow between the wall portion 11 and mount hole 16. During this time, a heat insulating gasket is inserted between the lower surface of the annular portion 18 of the piston head 7 and the upper surface of an outer circumferential part of the upper wall portion 19 of the piston skirt 9 for the purpose of insulating these parts against heat. Since the piston head 7 and piston skirt 9 are fixed to each other with the lower end surface of the annular portion of the former engaged with the upper surface of the outer circumferential part of an upper wall portion 19 of the latter, a heat insulating air layer 17 is formed between the lower surface of the piston head 7 and the upper surface of the upper wall portion 19 of the piston skirt 9 for the heat insulation of these two parts from each other.

This engine with precombustion chambers has main combustion chambers 1 consisting of cavities 4 formed in the piston heads 7 so as to extend conically toward the centers of the pistons, precombustion chambers 2 provided in the substantially central portions of the piston heads 7, main communication ports 5 formed in the substantially central portions of the piston heads and communicating the main combustion chambers 1 and precombustion chambers 2 with each other, a plurality of auxiliary communication ports 6 formed around the main communication ports 5 so as to extend incliningly toward the circumferences of the cylinders 8 and communicating the main combustion chambers 1 and precombustion chambers 2 with each other, and fuel injection nozzles 10 provided in the cylinder head 15, adapted to be projected into the main communication ports 5 in positions in the vicinity of top dead centers of the pistons and close the same port 5, and used to inject a fuel into the precombustion chambers 2.

Each main combustion chamber 1 is formed conically in an upper surface 27 of the relative piston head 7 so as to converge toward the center of the piston, and a plurality of auxiliary communication ports 6 are opened incliningly toward the portions of the lower surface 26 of the cylinder head which correspond to the circumference of the relative cylinder. Accordingly, in the compression top dead center, a large amount of air exists in the central portion of the main combustion chamber 1, and gases, such as flames and unburnt gaseous mixture advance smoothly in the shape of an edge of a knife to the circumferential portion of the cylinder. The entry of these gases into the mentioned portion of the cylinder can be effected in a short period of time with a speed converted into a pressure. A plurality of, for example, 4–6 auxiliary communication ports 6 are provided radially in a regularly spaced manner around the main communication ports 5 so that the gases, such as flames and unburnt gaseous mixture injected from the precombustion chamber 2 into the main combustion chamber 1 advance toward the circumference of the cylinder 9. Owing to the provision of the auxiliary communication ports 6 around the main communication port 5, the travel distance of the gases, such as flames and unburnt gaseous mixture, which are elected from the precombustion chamber 2 into the main combustion chamber 1, between the precombustion chamber 2 and the circumference of the cylinder becomes equally shorter, and the time required by these gases to cover this distance decreases.

Each fuel injection nozzle 10 is wrapped at its outer circumferential portion in a heat insulating cover 12, and thereby insulated and protected against the heat in the main combustion chamber 1, precombustion chamber 2 and main communication port 5. The fuel injection nozzle 10 is projected into the main communication port 5 in a position in the vicinity of the top dead center of the piston, and positioned in the central portion of the precombustion chamber 2, the fuel injection nozzle being provided with a multi-bored injection port 22 so as to spread a fuel, which is injected into the precombustion chamber 2, from the central portion thereof toward the circumference thereof. The height of a clearance forming the cavity 4 between the piston head upper surface 27 and cylinder head lower surface 26 in the top dead center of the piston is set as small as possible at the circumference of the piston, and gradually larger toward the center of the piston.

The precombustion chamber wall portion 11 of the piston head 7 is formed to a small thickness so that a precombustion chamber 2 is formed in the central portion of the piston. The piston head 7 and piston skirt 9 are spaced from each other via the heat insulating air layer 17 except that they contact each other at the annular portion 18 and the upper surface of the upper wall portion 19 and at the precombustion chamber wall portion 11 and the inner surface of the mount hole 16. The fuel injection nozzle 10 extends from the cylinder head lower surface 26 in the downward direction, projects from the main communication port 5 into the precombustion chamber 2 in a position in the vicinity of the top dead center of the piston, and injects a fuel from the multi-bored injection port 22 provided in the nozzle 10 into the precombustion chamber 2. The precombustion chamber 2 formed in the precombustion chamber wall portion 11 is positioned in the substantially central portion of the cylinder 8, and the auxiliary communication ports 6 communicating the precombustion chamber 2 and main combustion chamber 1 with each other in the outer circumferential portion of the precombustion chamber 2.

Since this engine with precombustion chambers is formed as described above, it can be operated as follows.

In this engine with precombustion chambers, the suction air introduced into each cylinder 8 through the suction port 14 in a suction stroke is compressed in a compression stroke and introduced into the precombustion chamber 2 through the main and auxiliary communication ports 5, 6. When the main communication port 5 is closed with the fuel injection nozzle 10 in a position in the vicinity of the compression top dead center, highly compressed air is further introduced into the precombustion chamber 2 through the auxiliary communication ports 6. In this condition, a fuel is injected from the multi-bored port 22 of the fuel injection nozzle 10 into the precombustion chamber 2, in which the fuel and air are mixed with each other, and the resultant gaseous mixture in ignited and burnt at a high fuel-air ratio, the operation of the engine advancing to an expansion stroke. Since the main communication port 5 is closed with the fuel injection nozzle 10 in an initial period of expansion stroke, the gases, such as flames and unburnt gaseous mixture in the precombustion chamber 2 is injected therefrom into the main combustion chamber 1 through the auxiliary communication ports 6.

Since the auxiliary communication ports 6 communicating the main combustion chamber 1 and precombustion 2 with each other are formed plurally in the circumferential portion of the precombustion chamber 2, a total cross-sectional area of these ports can be increased greatly, and a throttle loss can be reduced. The precombustion chamber 2 is formed in the central portion of the piston, i.e., in the central portion of the cylinder. Accordingly, the gases, such as flames and unburnt gaseous mixture injected from the outer circumference of the precombustion chamber 2 into the main combustion chamber 1 through the auxiliary communication ports 6 reach the portion of the main combustion chamber 1 which corresponds to the circumference of the cylinder while picking up therein the fresh air existing in the whole circumferential portion of the cylinder, i.e. the main combustion chamber with an air utilization rate improved and with the time which is required for the travel of the gases from the precombustion chamber to the cylinder wall surface kept at a uniform and reduced level, and the mixing of the gases with the air is promoted as the air utilization rate is improved. The piston is then moved down, and the fuel injection nozzle 10 comes out of the main communication port 5, so that the main communication port 5 is opened. Consequently, the gases, such as flames and unburnt gaseous mixture are injected from the precombustion chamber 2 into the main combustion chamber 1 through the main communication port 5, and the mixing of the gases with the air existing in the central portion of the main combustion chamber 1 is promoted to enable a combustion speed to increase, a combustion period to be reduced, and the combustion operation to be carried out with a minimum generation of NOx, HC and smoke. Moreover, the combustion of gaseous mixture in the precombustion chamber 2 is carried out at a high fuel-air ratio, so that the generation of NOx can be minimized.

Figure 2:
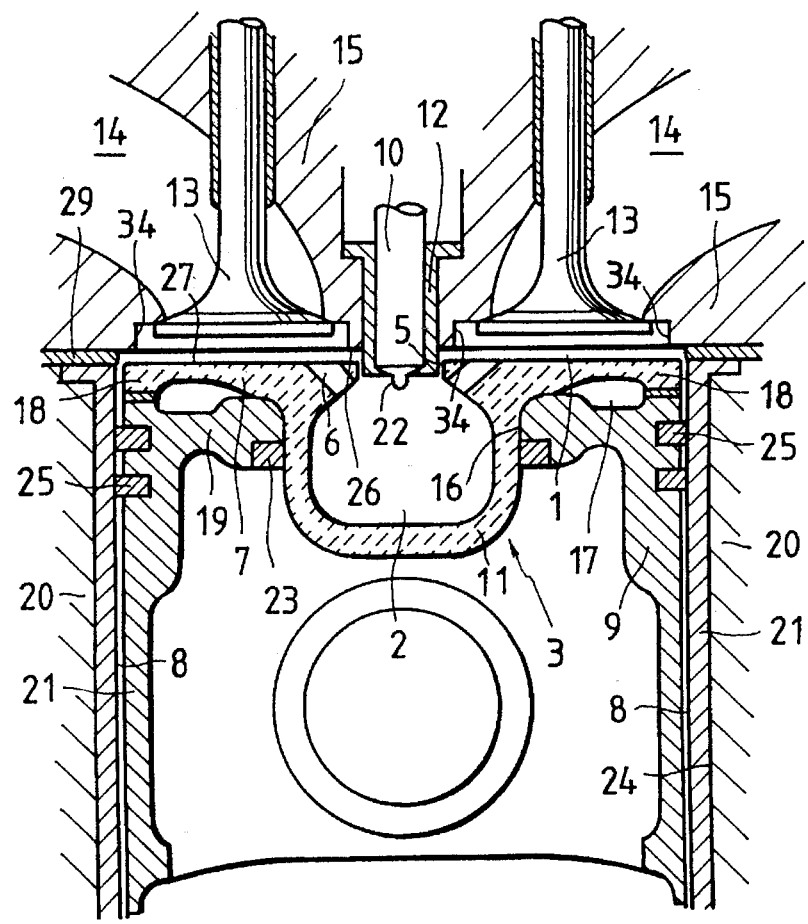
FIG. 2 is a sectional view of another embodiment of the engine with precombustion chambers according to the present invention.
Figure 3:
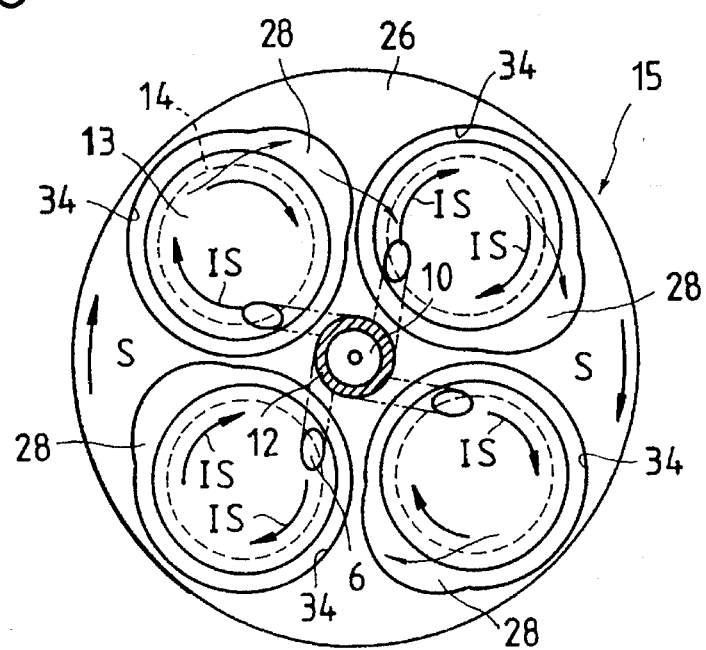
FIG. 3 illustrates an example of a lower surface of a cylinder head of the engine with precombustion chambers of FIG. 2.

Another embodiment of the engine with precombustion chambers according to the present invention will now be described with reference to FIGS. 2 and 3. This embodiment has substantially the same construction as the previously described embodiment except that main combustion chambers 1 formed in piston heads 7 in the latter embodiment are formed in a cylinder head lower surface 26 in the former embodiment. Therefore, the same parts are designated by the same reference numerals, and the duplication of descriptions thereof is omitted.

This embodiment is a precombustion chamber type diesel engine having precombustion chambers 2 on the side of cylinders 8, in which main combustion chambers 1 comprise of a plurality of cavities 34 formed in the portions of a lower surface of a cylinder head 15 which are around fuel injection nozzles 10. The auxiliary communication ports 6 are formed in an offset manner with respect to the centers of the precombustion chambers 2. The turning flows IS of flame jets injected from the precombustion chambers 2 toward the cavities 34 through the auxiliary communication ports 6 are mixed with suction swirls S existing in the main combustion chambers 1.

The cavities 34 are formed plurally (in four portions in the drawing) in the cylinder head 15, and, more in detail, in escape recesses for suction exhaust valves 13 provided in the cylinder head 15 or in the regions other than these escape recesses. The cavities 34 may be formed by making recesses in a lower surface of the cylinder head 15, and used also as escape recesses for valves. The cavities 34 may also be formed by making recesses in the portions of the lower surface of the cylinder head 15 in which escape recesses for the suction exhaust valves are not formed. Each of the cavities 34 is provided with an escape recess 28 for flames which is enlarged toward the circumferential direction of a turning flow of flames ejected from the relative precombustion chamber 2 into the main combustion chamber 1 through the auxiliary communication ports 6. This enables the injection energy of a turning flow IS of flame jet ejected from the precombustion chamber 2 into the main combustion chamber 1 to be amplified in the escape recess 28 for flames, the mixing of a suction swirl S, i.e. fresh air remaining in the main combustion chamber 1 with flames to be promoted, an air utilization rate to be improved, a combustion speed to increase, a combustion period to be reduced, a combustion operation to be completed in a short period of time, a thermal efficiency to increase, and the generation of NOx and HC to be minimized.

In this engine with precombustion chambers, a plurality of auxiliary communication ports 6 are opened toward the circumference of the cylinder in a diagonal direction with respect to the cylinder head lower surface 26. These ports 6 are formed plurally, for example, 4–6 ports 6 are formed radially in a regularly spaced manner around the main communication port 5 so that the gases, such as flames and unburnt gaseous mixture are injected from the precombustion chamber 2 into the main combustion chamber, which comprises of the cavity 34, toward the circumference of the cylinder 8.

Each fuel injection nozzle is adapted to project into the main communication port 5 in a position in the vicinity of the top dead center of the piston, and positioned in the central portion of the precombustion chamber 2, and it has a multi-bored injection port 22 so that a fuel is injected from the central portion of the precombustion chamber 2 to the circumferential portion thereof and into the main combustion chamber 1 consisting of the cavity 34. Each piston head 7 is formed so as to have a flat surface in such a manner that the height of a clearance between a piston head upper surface 27 in the top dead center of the piston and a cylinder head lower surface 26 is small generally and large in a region in which the cavity 34 is formed.

Since this engine with precombustion chambers is formed as described above, it has the following effects in addition to the effects of the previously described embodiment. In the engine with precombustion chambers of FIGS. 2 and 3, the main communication port 5 is closed with the fuel injection nozzle 10 in an expansion stroke, so that the gases, such as flames and unburnt gaseous mixture in the precombustion chamber 2 are injected therefrom into the main combustion chamber 1, which comprises of the cavity 34, through the auxiliary communication ports 6. The precombustion chamber 2 is formed in the central portion of the piston, i.e., in the central portion of the cylinder, so that the gases, such as flames and unburnt gaseous mixture injected from the outer circumference of the precombustion chamber 2 into the main combustion chamber 1 through the auxiliary communication ports 6 are guided by the auxiliary communication ports 6 and cavity 34, i.e. escape recess for valves to turn into a turning flow IS of flame jet, which is then mixed with the section swirl S existing in the main combustion chamber 1. The resultant gaseous mixture picks up therein the fresh air existing in the main combustion chamber 1 and then the air existing in the escape recess 28 for flames, whereby an air utilization rate is improved with the premixed combustion of the gaseous mixture promoted. The piston 3 then moves down to cause the fuel injection nozzle 10 to come out of the main communication port 5, and the main communication port 5 is therefore opened. The gases, such as flames and unburnt gaseous mixture are then elected from the precombustion chamber 2 into the main combustion chamber 1 through the main communication port 5 to promote the mixing of the gases with the air existing in the central portion of the main combustion chamber 1, and increase the combustion speed. This enables a combustion period to be reduced, and a combustion operation to be carried out with the generation of NOx, HC and smoke minimized.

What is claimed is:

1. An engine with precombustion chambers, having a cylinder head fixed to a cylinder block provided with cylinders, suction and exhaust valves adapted to open and close suction and exhaust ports formed in said cylinder head, main combustion chambers formed in said cylinders, pistons comprising piston heads in which precombustion chambers are provided and piston skirts fixed to said piston heads, and adapted to be moved reciprocatingly in said cylinders, communication ports communicating said main combustion chambers and said precombustion chambers with each other, and fuel injection nozzles fixed to said cylinder head and capable of injecting fuel into said precombustion chambers, wherein:

said main combustion chambers are formed by cavities provided in said pistons, said precombustion chambers being formed in the substantially central portions of said piston heads, said communication ports comprising main communication ports formed in the substantially central portions of said piston heads and communicating said main combustion chambers and said precombustion chambers with each other, and auxiliary communication ports formed around said main communication ports so as to extend incliningly toward the circumferences of said cylinders and communicating said main combustion chambers and said precombustion chambers with each other, and said fuel injection nozzles having heat insulating structures, and being adapted to project into said main communication ports in positions in the vicinity of the top dead centers of said pistons and close the same and provided with injection ports for injecting a fuel into said precombustion chambers.

2. An engine with precombustion chambers according to claim 1, wherein said piston heads are formed out of a heat resisting material, said piston heads and said piston skirts being able to be fixed to each other by fitting precombustion chamber wall portions, which form said precombustion chambers, in central mounting holes formed in said piston skirts.

3. An engine with precombustion chambers according to claim 1, wherein said heat insulating structures of said fuel injection nozzles comprise heat insulating covers applied to outer circumferential portions thereof.

4. An engine with precombustion chambers according to claim 1, wherein said cavities constituting said main combustion chambers and provided in said pistons are formed conically so as to converge toward the centers of said piston heads.

5. An engine with precombustion chambers according to claim 4, wherein said main combustion chambers provided conically in said piston heads are formed so that the height of clearances between upper surfaces of said piston heads and lower surface of said cylinder head in top dead centers of said pistons is set as small as possible at circumferences of said pistons and gradually larger toward the centers of said pistons.

6. An engine with precombustion chambers, having a cylinder head fixed to a cylinder block provided with cylinders, suction and exhaust valves adapted to open and close suction and exhaust ports formed in said cylinder head, main combustion chambers formed in said cylinders, pistons comprising piston heads in which precombustion chambers are provided and piston skirts fixed to said piston heads, and adapted to be moved reciprocatingly in said cylinders, communication ports communicating said main combustion chambers and said precombustion chambers with each other, and fuel injection nozzles fixed to said cylinder head and capable of injecting fuel into said precombustion chambers, wherein:

said main combustion chambers are formed by cavities provided in said cylinder head, said precombustion chambers being formed in the substantially central portions of said piston heads, said communication ports comprising main communication ports formed in the substantially central portions of said piston heads and communicating said main combustion chambers and said precombustion chambers with each other, and auxiliary communication ports formed around said main communication ports so as to extend incliningly toward the circumferences of said cylinders and communicating said main combustion chambers and said precombustion chambers with each other, said fuel injection nozzles having heat insulating structures, and being adapted to project into said main communication ports in positions in the vicinity of the top dead centers of said pistons and close the same and provided with injection ports for injecting a fuel into said precombustion chambers, and said auxiliary communication ports being formed in an offset manner with respect to the centers of said precombustion chambers, turning flows of flames injected from said precombustion chambers into said cavities through said auxiliary communication ports being mixed with suction swirls existing in said main combustion chambers.

7. An engine with precombustion chambers according to claim 6, wherein said piston heads are formed out of a heat resisting material, said piston heads and said piston skirts being able to be fixed to each other by fitting precombustion chamber wall portions, which form said precombustion chambers, in central mounting holes formed in said piston skirts.

8. An engine with precombustion chambers according to claim 6, wherein said heat insulating structures of said fuel injection nozzles comprise heat insulating covers applied to outer circumferential portions thereof.

9. An engine with precombustion chambers according to claim 6, wherein said cavities, which constitute said main combustion chambers, in said cylinder head are formed in the portions of a lower surface of said cylinder head which are around said fuel injection nozzles.

10. An engine with precombustion chambers according to claim 9, wherein said cavities are provided in escape recesses for valves in said cylinder head.

11. An engine with precombustion chambers according to claim 9, wherein said cavities are provided in regions of said cylinder head which are other than said escape recesses.

12. An engine with precombustion chambers, having a cylinder head fixed to a cylinder block provided with cylinders, suction and exhaust valves adapted to open and close suction and exhaust ports formed in said cylinder head, main combustion chambers formed in said cylinders, pistons comprising piston heads in which precombustion chambers are provided and piston skirts fixed to said piston heads, and adapted to be moved reciprocatingly in said cylinders, communication ports communicating said main combustion chambers and said precombustion chambers with each other, and fuel injection nozzles fixed to said cylinder head and capable of injecting fuel into said precombustion chambers, wherein:

said main combustion chambers are formed by cavities provided in said cylinder head, said precombustion chambers being formed in the substantially central portions of said piston heads, said communication ports comprising main communication ports formed in the substantially central portions of said piston heads and communicating said main combustion chambers and said precombustion chambers with each other, and auxiliary communication ports formed around said main communication ports so as to extend incliningly toward the circumferences of said cylinders and communicating said main combustion chambers and said precombustion chambers with each other, said fuel injection nozzles having heat insulating structures, and being adapted to project into said main communication ports in positions in the vicinity of the top dead centers of said pistons and close the same and provided with injection ports for injecting a fuel into said precombustion chambers, wherein said cavities are provided with escape recesses for flames which are enlarged toward the circumferences of turning flows of flames injected from said precombustion chambers into said main combustion chambers through said auxiliary communication ports.

13. An engine with precombustion chambers according to claim 12, wherein said cavities which constitute said main combustion chambers in said cylinder head are formed in the portions of a lower surface of said cylinder head which are around said fuel injection nozzles.

\* \* \* \* \*